June 24, 1958 — V. F. ZAHODIAKIN — 2,839,808
FASTENING DEVICES
Filed Feb. 15, 1956 — 2 Sheets-Sheet 1

INVENTOR.
VICTOR F. ZAHODIAKIN.
BY Howard P. King
ATTORNEY.

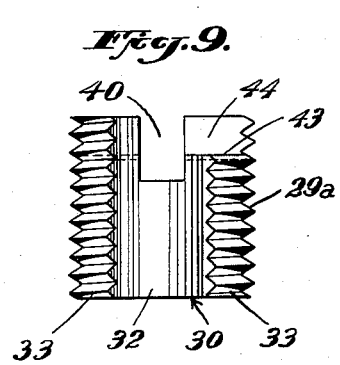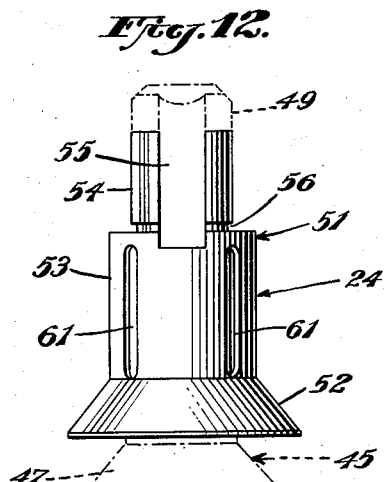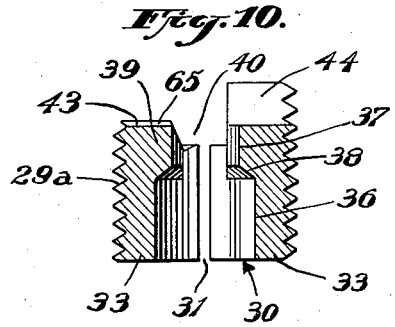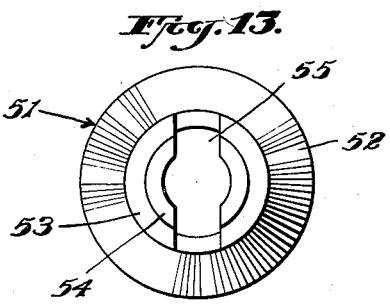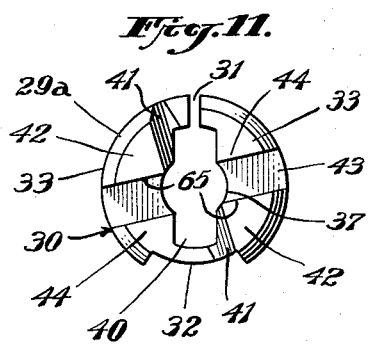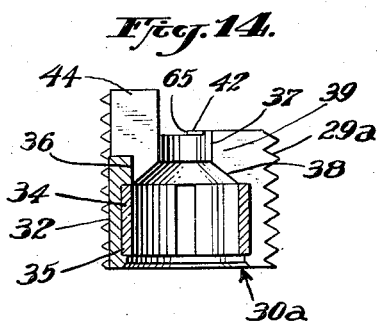
INVENTOR.
VICTOR F. ZAHODIAKIN.
BY
Howard P. King
ATTORNEY.

United States Patent Office 2,839,808
Patented June 24, 1958

2,839,808
FASTENING DEVICES

Victor F. Zahodiakin, Summit, N. J.

Application February 15, 1956, Serial No. 565,650

18 Claims. (Cl. 24—221)

This invention relates to a rotary type fastener device and particularly to the quick-locking stud and socket type wherein clamping is obtained by engaging the stud with the socket by means of rotation of the stud.

There have been many efforts to design stud and socket type fasteners of high strength, but they have not been satisfactory for many reasons, such as, inability to retain constant torque, inability to obtain engagement of the stud in the socket without special effort or force, inability to provide positive locking means which will not depend upon compression springs effective on the members being clamped, need for many sizes inclusive of ones difficult to manufacture at a reasonable cost, failure to obtain desirable durability under heavy and excessive loads, and so forth.

Fastening devices of this general character have extensive use in airplane construction, and in a great many commercial applications, such as for securing parts, fuselages, components, brackets, doors, panels and a multiplicity of other members too numerous to be enumerated. It is important to note that in the use of common fastening devices of quick-clamping type, a great many sizes are employed due to inability or inaptitude of any given size of fastening device to be used for clamping all of the great variety of thicknesses encountered in members of such diversity as indicated above. Consequently users have to stock a great quantity of various sizes or "numbers" of component parts to adapt the devices for required thicknesses of material to be fastened together, since normally the prior art devices are each made to accommodate only one specific thickness of members, and not to exceed a tolerance of 0.30 inch, and therefore, when such members are slightly greater than the thickness specified, a different size of fastener or a component part thereof must be used to accommodate the greater thickness. Similarly, when the thickness is less, a different fastener or component part is required.

A further inherent defect of prior art devices of quick-locking type is that they are only able to carry a very limited load in respect to the tensil strength or shear stresses of the weakest component, and therefore, can be useful only for light applications where no substantial load will be encountered and where ability to carry the load will depend on the strength of the devices. For example, prior are devices when loaded in excess of fifty or seventy-five pounds admit deflection to take place, and, therefore, the clamped members are permitted to separate, with the result of undesirable and perhaps tragic consequences or damage, particularly in the use of the devices in aircraft. This deflection will generate vibration and finally breakage of such devices due to crystallization of component parts of such fastening devices, and the clamped members become unfastened and separated, and when this occurs with outside plates or other vital parts of an aircraft in flight, the consequences may be tragic as unfortunately taught by accidents of record.

It is further a well known fact that prior art quick-locking fastening devices have no provision to compensate for wear, and experience has proven that when the wear exceeds certain limitations those devices, sometimes very quickly, have become totally ineffective. Almost invariably quick-locking devices of the prior art depend on coil springs or flat sheet steel springs to provide tension for clamping by the device, and when the load exceeds the spring tension repetitiously in rapid succession, deflection and vibration occur in the members being clamped and in the components of the device. It is a well known fact deflection and vibration in metal causes crystallization thereof, especially in metal that has been heat treated, and cracked members and fractured devices have resulted in use. It is also a fact that heat treatment is required in the fabrication of springs, and where permissible maximum hardness is exceeded, as sometimes occurs, the springs are embrittled and consequently break in use and result in the device becoming ineffective.

The large discrepency between the permissible hardness of the springs of the prior art devices and the surfaces against which they have bearing has presented a difficult problem. The bearing surfaces can be and most desirably are case carburized and hardened, but the springs cannot be so hardened and consequently are subject to rapid wear where constantly rubbing on the case carburized hardened surface and the spring becomes increasingly ineffective as a result.

Broadly considered, the invention proposes a construction that will overcome the above-recited and other defects, short-comings and problems of the prior art.

An overall object of the invention is to effect a solid clamping by a device wherein no deflection is permitted within the device when in its clamping condition.

The invention also contemplates provision of a device in which lateral movement of clamped members under shear load is prevented within higher limits than heretofore attained by prior art devices.

Closely related to the foregoing objects, is one proposing a structure which will not be released or opened by any adverse force encountered in use, such as vibration, heavy loads, shear, or other stresses.

Viewed further in its broad aspect, the invention contemplates the provision of a fastening device which will be readily applicable and of universal character.

Apropos to the foregoing object is the purpose to provide an improved fastening device which will accommodate and be readily adjustable to clamp a varying number and/or thicknesses of members to be clamped together.

An essential object of the invention is to provide a fastening device which avoids interposing a load-supporting spring between the gripping means and the members being clamped, or, in other words, one which avoids loading a spring with the load carried by the fastening device.

Another object of the invention is to provide a fastening device in which constituent components are held tightly under high tension thereby preventing said components from oscillating between themselves, and thereby eliminating usual wear prevalent in prior art devices.

More specifically the invention proposes a high strength fastening device the component parts whereof become in effect like one solid mass of metal in which no movement, vibration or wear is possible when set to clamping position.

Another object of the invention is to provide a fastening device of high strength and which will accomplish tight clamping but is conveniently operated and requires no special tools for installation and use and is readily applied and released when desired in the field.

Yet another object of the invention is to provide a stud, which during initial stage of insertion in its socket may have minimum projection from the member by which it is carried, thereby adapting the fastening device to use with curved members.

In addition to fundamental objectives referred to above and having in mind the foregoing and other drawbacks and deficiencies of the prior art, it may be broadly stated that the present invention proposes construction of a fastening device of totally new character and design.

Still further objects, advantages and results will become evident to persons skilled in the art to which the invention appertains, as the description proceeds, both by direct recitation thereof and by implication from the context.

Referring to the accompanying drawings in which like numerals of reference indicate similar parts throughout the several views;

Figure 1 is a plan of a fastening device applied to a member being clamped;

Figure 2 is an elevation of the same;

Figure 3 is a vertical sectional view on line III—III of Fig. 1;

Figure 4 is a cross-sectional view on line IV—IV of Fig. 3, but with the stud omitted;

Figure 5 is another sectional view corresponding to Fig. 4, but showing the stud in position;

Figure 6 is a perspective view of the stud alone;

Figures 7 and 8 are plan views of two retainer rings used with the stud element;

Figure 9 is an elevation of the nut looking toward the thinned or resilient area thereof;

Figure 10 is a sectional view of the nut on an axial-diametric plane looking in the same direction as in Fig. 9, with the front half of the nut cut away;

Figure 11 is a plan of the nut;

Figure 12 is an elevation of the anchor bushing and showing one position of stud therein by dot-dash lines;

Figure 13 is a plan of said anchor bushing; and

Figure 14 is a section on an axial-diametric plane of a modified construction of nut.

In the specific embodiment of the invention illustrated in said drawings, the reference numerals 20, 21 designate two members, which may be straight or curved, and adapted to be, in ultimate position, juxtaposed and clamped together by the fastening device of the present invention. these members are representative of any number and thicknesses of bodies to be clamped together, said members having holes 22, 23 therein adapted to register with each other and intended to receive a stud element 24 more fully described hereinafter.

The fastening device comprises, as part of the socket portion thereof, a fixed cylinder 25 having a threaded bore somewhat larger than and in axial registration with hole 22 of adjacent member 20. Said cylinder has an external flange 26 at its end next to said member 20, said flange being riveted, as at 27, to said adjacent member. The end of said cylinder toward member 20, is open, whereas the other end is preferably closed for protective purposes, and in Figures 1 and 3 the closure is shown effected by means of a disc 28 held in place by spinning the rim of the cylinder over the edge of said disc. The advantage of use of a closure disc rather than an integral dome formation, is that the cylinder is more conveniently fabricated and its interior side wall screw-threaded from the open end upwardly into proximity to the closed end. It is appropriate to here note that the threading is V-shaped or otherwise tapered threads 29, the pitch diameter whereof is uniform and predetermined.

Within said cylinder 25 is an expandable nut, designated in Figs. 3 to 5 and 9 to 11, by reference numeral 30, and in Fig. 14 by numeral 30a. In both showings of said nuts 30 and 30a, the nut is split on a longitudinal-radial plane providing a gap 31 between the ends created by splitting the nut thereat. In its original state, before being split, the nut is fully threaded with threads 29a having substantially the same pitch diameter and taper as the threads 29 of the cylinder 25. Directly opposite to said split, but with a circumferential width greater than width of said gap 31, the nut is provided with a thinned area 32 which provides resiliency for the spreading and retraction radially of the two segments 33, 33 extending from each side of the thinned area to said gap. According to the preferred mode of manufacture, the nut may be desirably made in the form of a hollow collar of such metal as chrome-vanadium steel with 0.50 carbon content, known commercially as ASAE 6150, and screw-threaded on its entire periphery with the threads having substantially the same pitch diameter as the threads of the cylinder 25 into which it is to be ultimately inserted. After threading, the nut is split longitudinally at one side, creating gap 31, and is then spread or expanded to a condition of approximately five to six thousandths of an inch over-size, and while in this expanded condition, is heat treated by well known processes to a hardness sufficient to generate resiliency. If exceptionally frequent use is intended to be made of the device, the nut may be lightly case carburized externally so that thereafter it will withstand continuous and severe usage. However, an essential feature of the invention is that said nut must flex and constantly expand against the threads of cylinder 25. Accordingly, I grind or otherwise remove an area of threading longitudinally of the nut at a part thereof diametrically opposite from gap 31, and it is by virtue of the removal of the threads and surface thereunder thinned area 32 is obtained which is free externally of case carburized surface and is fully and desirably resilient and will withstand flexing indefinitely. It will now be apparent that since the nut is over-size and resilient, it may be initially squeezed for insertion into the first convolution of the threads of the cylinder, and will have constant torque as screwed fully into the cylinder. Subsequently said nut will be further squeezed or contracted in use as screwed home in said cylinder, against protuberances of the stud element, by virtue of the taper of the threads as will be more fully explained subsequently herein.

To obtain torque and resiliency, the nut could alternatively, be externally threaded with a normal pitch diameter in accordance with engineering practices, and then case carburized and heat treated to generate resiliency. After that treatment, the nut would be split and have threads removed from a restricted surface area diametrically opposite the split, as above described. With the nut thus formed, the cylinder in which to be used, would be threaded under-size, that is, with a pitch diameter of its threads less than the pitch diameter of the normal or standard threads of the nut. Therefore, when the split nut is screwed into the cylinder it will be resiliently contracted and have a constant torque.

If so desired, and as shown in Figure 14, the inherent resiliency of the split nut may be augmented by inclusion of an expander 34 therein. For incorporation of this feature, in addition to the thinning of the nut by removal of the threads at area 32, an internal annular groove 35 may be made at the inside of said nut 30a to receive said expander which is formed as a single convolution of a clock spring the ends of which approach each other but do not quite meet. Removal of the additional metal of the nut to accommodate the expander of course renders the nut somewhat more flexible. In either construction of nut, the degree of flexibility and amount of expansion may be governed at the time of fabrication by the depth to which the metal is removed on the threaded side of the nut at the thinned area. Likewise, in both constructions, it will be appreciated that until the nut is compressed and inserted into the threaded cylinder, the pitch diameter of the nut threads will be slightly greater than the pitch diameter of the threads of said cylinder, but when the nut is screwed into its threaded engagement within said cylinder, the threads tightly intermesh and have substantially equal pitch diameters. Yet the split of the nut will enable the taper of the intermeshing threads to wedgingly squeeze the nut still further under conditions of attempted further rotation of the nut when longitudinal displacement of the nut is stopped, and under that circumstance, which it will soon be seen occurs in use, the pitch diameter of the nut will be less than the pitch diameter of the cylinder threads depending upon the amount of axial pressure.

The coaxial hollow through the nut is diametrically larger at the lower end portion of the nut than at the upper end portion, and for brevity said portions of the hollow may be designated as the major bore 36 and minor bore 37 respectively, the two bores being joined by a tapered or frusto-conical wall 38. In Fig. 14, the major bore is, for the most part, also the inside surface of the expander. By virtue of the different bore diameters, the upper part of the nut above tapered wall 38 projects radially inward farther than the lower part of the nut at bore 36 and will be referred to as the collar portion 39 of the nut in both showings. Across said collar portion extends a double key-hole slot 40 which utilizes minor bore 37 as the central bulge making the slot of key-hole formation, and having the ends of the slots dividing said tapered wall diametrically and effecting a corresponding division of said collar at opposite sides of said minor bore. Stud protuberances, hereinafter defined, are intended to be passed through said keyhole slot and in clockwise direction of rotation of said stud the end portions or wings of said slots taper with straight slopes 41 so the protuberances will advance to the upper or outer end of the nut by rotating the stud. At the end of the nut where the said slots terminate, the nut provides a flat surface 42 in a plane perpendicular to the nut axis. In the direction of continued rotation of the stud, the flat surface 42 terminates abruptly at a declivity 43 to which further reference will be made presently, and at the far side of the declivity is a high wall or barrier 44.

The stud element 24 is composed of several parts which are assembled and normally remain intact in use. Said element includes a stud 45 having an elongated cylindrical solid metal shank 46 in this instance having a tapered head 47 between which and the shank is an axially short cylindrical bearing 48 providing a flat rim around said shank facing toward the remote end from said head. At said remote end of the shank, transverse or radially projecting protuberances 49 are provided, here shown as integrally formed with said shank diametrically opposite to one another and presenting a double-keyhole formation when viewed from the end of the shank. The top edges of the protuberances and the top end of the stud shank are shown at the same level and chamfered all around so that the stud may be readily introduced into the hollow of nut 30 or 30a and into the double key-hole slot 40. The under faces of the protuberances 49 are formed as flat shoulders 50 in a common plane perpendicular to the axis of the shank 46. The side faces of the protuberances are parallel to each other and are perpendicular to said shoulders and plane thereof, the distance between said parallel faces being herein referred to as the width of said protuberances, and the projection radially from the surface of the shank to the outer ends of said protuberances is referred to as the length thereof.

Another constituent part of said stud element is a body revolution coaxial with and around the stud and referred to herein as an anchor bushing 51 which has a fixed location when the fastening device is clamping members together, but which is movable outwardly in the same direction of outward releasing movement of the stud head when clamping by said stud is released.

Said bushing 51 is made of high carbon steel and heat treated to generate resiliency and has an outer flared seating portion 52 which fits in the flared hole 23 of outer member 21 and receives and seats the flared head 47 of the stud, and in that respect functions as a grommet. Next beyond flared seating portion 52, projecting from the smaller end thereof, is a cylindrical housing section 53, and beyond that is a neck 54 which is split, as by a longitudinal-diametric slot 55, for its entire length.

Both internally and externally, said housing section 53 has greater respective diameters than the neck, and for brevity, the housing may be designated as of major diameter and the neck as of minor diameter. The internal diameter of the neck is substantially equal to the external diameter of the stud shank 46 so that the stud may slide therein. However, by virtue of the neck being split and by utilization of high carbon heat-treated steel, resiliency is obtained for said bushing and especially for its neck, the segments of the neck at opposite sides of the split may be squeezed into tight frictional holding engagement with said shank as will be dealt with more fully hereinafter. The outside diameter of said neck is such that it will slidably enter the hollow or major bore 36 of the nut on assembly of the stud element with the socket element, and the abovedescribed length of said protuberances 49 is substantially equal to the radial thickness of said neck so that the protuberances may be introduced through the slot 55 of said neck to the upper end of the neck. At the bottom end of said neck, where it joins with housing section 53 there is a peripheral groove 56 that intercepts slot 55 of the neck, and after introduction of the stem shank and protuberances through the neck a snap ring 57 is applied in said groove for preventing the removal of the stud from the bushing, but still permitting a considerable longitudinal sliding of the stud with respect to said bushing, and by virtue of the snap ring being at the bottom of the neck, the stud may withdraw to the extent of its upper end and protuberances not projecting beyond the end of said neck in the most retracted position of the stud.

The greater diameter of the interior of the hollow of housing section 53 is sufficient to admit passage therethrough of the protuberances upon initial assembly of the stud and bushing. There is, therefore, an annular space 58 between the interior surface of said housing and the stud shank which terminates with a cross-wall or shoulder 59 at the junction of the housing with the neck, it being understood that the aforementioned slot 55 of the neck also extends through the said cross-wall to admit initial passage of the protuberances 49 therethrough in the assembly of the bushing on the stud. When the stud is in its locked or most inward position with respect to the bushing, aforementioned bearing 48 fits within the lower end of housing section 53 and will effectively brace the housing wall against lateral shear stresses applied thereat and will also locate and hold the stud coaxial thereto and will prevent the stud from being bent, it also being noted that retention of the stud shank by the neck, nut and cylinder also cooperate to prevent the stud shank from being bent. It is also particularly pointed out that when the device is in clamping position, a medial plane through said bearing 48, perpendicular to the axis of the stud, will coincide with the plane of the juxtaposed faces of members 20, 21 being clamped, and therefore the shear stresses exerted by attempted sliding on one of said members with respect to the other will be resisted on diametric lines through said bearing.

The annular space 58 conveniently accommodates a coil spring 60 the ends of which bear against said bearing 48 and against said cross-wall or shoulder 59 tending to slide the stud outwardly from the bushing as far as permitted by the protuberances, the maximum projection of the stud head being effected when the protuberances are brought into registration with and slide into the neck slot 55 to a depth limited by their engagement with interposed snap ring 57. It is desirable, however, to obtain as short a projection of the device at the rear of front member 21 as possible in order to meet the conditions encountered when the members being clamped are curved, at which time the approach of the stud element toward the socket element will be with an angularity of axis, the angle lessening as the members swing closer together. In order to accomplish this desideratum, the stud element bushing is mounted so that it also may be slid outwardly.

According to the present showing, the exterior surface of housing 53 has a plurality of longitudinal channels or flutes 61 extending from junction of said housing with the flared end lengthwise of said housing about as far as the level of cross-wall 59, but with the upper ends of the channels or flutes closed. A snap ring 62 is applied over the housing, said ring having tongues 63 ridable in said channels. An annular recess 64 is provided at the inside surface of front or outer member 21 at opening 23 thereof to accommodate said snap ring in assembled condition of the members. In separated condition of said members, housing 53 by gravity or by being physically actuated, may be moved forwardly until the tongues 63, by engagement with the upper ends of the channels, stop it, and it will be appreciated that under those circumstances little more than just the neck 54 projects rearwardly, it being borne in mind that the stud and its protuberances can be nested fully downward into said neck. By this arrangement, very close approach of curved members can be obtained before entry of the stud element into the hole 22 of member 20 is required, and therefore the axes of stud and approached hole will more nearly coincide. In this connection, it may also be said that the outside diameter of said housing is substantially the same as the diameter of the hole 22.

In operation, it will be understood that the socket element, comprising internally threaded fixed cylinder 25 and flange 26, will be mounted on member 20, and the expandable nut 30 (or 30a) will be compressed to normal side and screwed well into said cylinder before the cylinder is riveted to said member, as a result of which the nut is irremovable and cannot become lost. The stud element 24 is preassembled with the stud 45 and spring 60 in place within bushing 51, and said stud is prevented from separation from the bushing by snap ring 57 in groove 56. The stud element will be mounted in hole 23 of outer member 21 in longitudinally movable association therewith by virtue of retention by tongues 63 riding in channels or flutes 61 within the limits of the lengths of said channels, the snap ring 62 being larger than the upper end of the flared hole 23, thereby limiting outward displacement of the ring, and the flare of the bushing in said hole limiting inward location of the bushing. When the members 20, 21 are brought together with the holes 22, 23 thereof substantially in coaxial alignment, bushing 51 will enter hole 22 and will continue into said cylinder 25 with neck 54 ultimately entering the major bore 36 of the nut. Pressing inward upon and clockwise rotating stud 45 with a screw driver or other appropriate tool will then introduce the stud and its protuberances into and through key-hole slot 40 of the nut and onto the top flat surface 42 thereof. Continued rotation of the stud will bring said protuberances into lateral engagement with barriers 44 at the far sides of declivities 43 in the top of the nut and still further rotation of the stud will cause said nut to rotate on its threads and advance longitudinally toward said protuberances which are thereby caused to seat in said declivities. This results in the head of the stud becoming firmly seated in the flare of the bushing and the flare to be firmly seated in the flared hole 23, the members thus being drawn into close engagement with each other. Final turns on the stud, which now cannot move any further longitudinally, causes the upper facets of the nut threads to exert a wedging action on the lower facets of the cylinder threads the effect of which is to contract said nut. Contraction of the nut results in applying a strong contracting force upon the segments of neck 54 which thereby obtains a tenacious frictional gripping action of the nut on the neck and of the neck on the shank 46 of the stud 45, not only locking the shank from inadvertent backward rotation until operator-applied force is used, but obtaining a support for the load thereby which is of course augmented by support of engagement of the protuberances on the top of the nut in said declivities. Thus the load support is not entirely upon the lugs or entirely by the frictional engagement, since one supplements the other.

To release the clamping device, the stud is forcefully rotated anti-clockwise by an appropriate tool, and, since I make declivity 43 in the nut rectangular and of a width substantially the width of the protuberances, such rotation immediately begins to retract the nut on its threads. The wall 65 of the declivity in the direction of the anti-clockwise rotation of the protuberances, is relatively low as compared to the height of barrier wall 44 so the protuberances will promptly clear that wall and then ride over the flat end surfaces 42 and come into registration with key-hole slot 40 of the nut, at which time spring 60 will cause the protuberances to slide down through the slot and permit the stud element to be withdrawn from the socket element and the members then separated.

As an advantageous constructional feature, it may be mentioned that it is preferable to situate the key-hole slot of the nut in the same diametric direction as the radial split of the nut, so that the said split is at one end of said key-hole slot in such diametric direction.

The constructions which are described above lend themselves to the nut and stud being case carburized and hardened. Since the stud, nut, bushing and cylinder are locked in very tight gripping engagement, there will be no vibration or oscillation effective therebetween, and thus the cause of wear so prevalent in prior art devices is totally eliminated. Also the shear load applied to the present device is spread over extensive lengths and surfaces, and because of this greater strength far greater loads can be carried by the device of this invention. This qualification of resistance to shear loads is of great and paramount importance where large stresses are involved and applied rapidly or with impacts, as these conditions occur constantly in use and construction of present-day high speed aircraft and the loads have attained such magnitude that requirements imposed on the fastening devices cannot be met by any known type or design of fastening devices of present-day manufacture which absorb or carry the load by inclusion of a spring. Also, since no spring is used in the present invention to carry any part of the load, inability to harden springs to a high degree or loss of temper in springs from heat no longer enter as limitations of manufacture or use. Furthermore, it may be pointed out that even though repeated opening and closing the device of this invention may result in wear occurring in the threads of the cylinder and nut, yet the expansibility and resilient outward pressure of the nut toward the cylinder keeps the threads interengaged and maintains a constant torque of rotation therefor. It also is not amiss to point out that the fastening device of this invention is fabricated from few and simple parts and is readily assembled, all of which tends toward economical manufacture and simplicity of replacement in the field. As the cylinder has a threaded length much longer than the nut, the device is capable of use with an equally great variation in number and/or thickness of members clamped.

It is believed to be clear from the above, that the nut can be locked at any position within the socket element to which it is adjusted, up or down, agreeable to the number or thicknesses of members being clamped, and the stud can be rotated by a screw driver to both bring the nut to its proper adjusted position and to lock and unlock the nut from its engagement with the bushing and the bushing with the stud. Normally, in use, the unlocking is effected by the anti-clockwise rotation of the nut by the initial engagement of the protuberances with the low wall of the declivities, and after it has passed over that wall no further rotation of the nut is necessary and the protuberances pass downwardly of the sloping surfaces of and out through the key-hole slot. However, if an adjustment of the nut is desired downwardly of the socket element, the operator, after releasing the protuberances from engagement with the declivities, can continue to press on his screw driver while they are rotated into engagement with the back side of barrier 44 and thereby cause the nut to be further rotated anti-clockwise and feed in a direction toward the open end of the socket element as far as the operator wishes to move it. Release of pressure by the operator on the screw driver will then permit the stud to be removed from the nut by withdrawal from the key-hole slot and will leave the nut in its newly adjusted position. To clamp the stud again at its new position with the added members, the stud is inserted as usual and if there is too much slack, it is taken up merely by screwing the stud clockwise and rotating the nut by engagement of the protuberances with the barrier until the protuberances reach the declivities which they will enter and become locked in as heretofore described.

I claim:

1. A fastening device comprising a stud element and a socket element for receiving the same, and a contractable nut interposed between said stud element and said socket element, adapted to grip and hold said stud element, said nut and socket element having interengaging screw threads of tapered cross-section, and said stud element including an elongated stud and a bushing on said stud, said bushing having a contractable section and said nut being located in use around said contractable section of said bushing, and by contraction of said nut producing contraction of said contractable section of the bushing and frictional gripping engagement of said bushing with said stud.

2. A fastening device in accordance with claim 1, wherein the pitch diameter of the threads of said nut is different before insertion of the nut into said socket element from the pitch diameter thereof after insertion, and different under load and non-load conditions after said nut is inserted in said socket element.

3. A fastening device in accordance with claim 1, wherein said nut is split at one side thereof and has a spring therein tending to expand said nut to a diameter greater than the diameter of the engaging threads of said socket element.

4. A fastening device in accordance with claim 1, wherein said threads produce the contraction of said nut under axial load and wherein said contraction of the nut obtains frictional gripping of both said bushing by the nut and of the stud by said bushing.

5. A fastening device in accordance with claim 1, wherein said bushing is made of high carbon heat-treated steel thereby made resilient.

6. A fastening device in accordance with claim 1, wherein said nut is split at one side thereof and reduced in thickness at an area opposite to said split and providing predetermined resiliency of the nut by the degree of reduction of thickness at said area.

7. A fastening device in accordance with claim 6, wherein flexing of said nut is entirely in the area of reduced thickness and the segments at each side of said reduced area as far as said split are rigid.

8. A fastening device in accordance with claim 6, wherein the thinned area is devoid of threads.

9. A fastening device in accordance with claim 6, wherein the segments from the thinned area to said split have the threads thereon and the external surfaces of said nut case carburized, and wherein said threaded segments are rigid, and said thinned area is substantially devoid of threads and case carburization.

10. A fastening device in accordance with claim 1, wherein said stud has lateral protuberances and wherein said nut has a double key-hole slot for passing said protuberances therethrough to the upper end of said nut, and said nut has means on said end for engagement by said protuberances for effecting rotation of the nut by rotation of said stud.

11. A fastening device in accordance with claim 10, wherein said means comprises a declivity with parallel walls and said protuberances have correspondingly parallel faces engageable with said walls of the declivity.

12. A fastening device in accordance with claim 10, wherein the lateral end portions of said key-hole slot each provides a sloping flat face for advancement of said protuberances to the upper end of the nut as said protuberances are revolved by rotation of said stud.

13. A fastening device in accordance with claim 10, wherein said bushing is constructed and arranged with means for slidably mounting the same in a member to be clamped.

14. A fastening device in accordance with claim 10, wherein tightening of the protuberances onto the end of said nut effects tightening of the nut on the bushing and tightening of the bushing on the stud and thereby provides support for the load partly by frictional grip due to said tightening of nut and bushing and partly by tightening of said protuberances on said nut.

15. A fastening device in accordance with claim 10, wherein one end of said bushing is flared for engagement in a member to be clamped, said flare joining with a housing of major diameter, and a neck of minor diameter at the other end of said housing, said flared end, housing and neck being integral and coaxial one with another.

16. A fastening device in accordance with claim 10, wherein one end of said bushing is flared for engagement in a member to be clamped, and the other end of said bushing is slotted to pass said protuberances therethrough.

17. A fastening device in accordance with claim 16, wherein said bushing has a peripheral groove intercepting said slot, and wherein a snap ring is situated in said groove to prevent withdrawal of said protuberances from the bushing in the direction of said flared end.

18. A fastening device for clamping members together, said device extending through said members, comprising a socket element permanently secured to and projecting rearwardly of a rear one of said members, and a stud element mounted in a hole of a front one of said members and projecting rearwardly thereof through said rear member and into said socket element, said stud element comprising an elongated stud having a head engaging at the front of said front member and having a bearing of major diameter partly within both of said members, said stud having a rearwardly extending shank of minor diameter coaxial with and projecting from said bearing, the rear end of said shank having radially projecting protuberances thereon, said stud element providing a bushing slidable on said stud, said bushing having an end thereof in underlying retained engagement with said stud head mounting said bushing rigidly on said front member when said stud is longitudinally tensioned rearwardly, said bushing having a forward hollow housing portion of major diameter adapted to pass the protuberances therethrough, and said bushing having a rearward neck portion projecting integrally and axially from said housing portion, said housing portion and neck portion having an intervening cross-wall therebetween and said cross-wall and neck having a diametric slot common to both for passing said protuberances therethrough, said neck having an internal minor diameter substantially equal to the minor diameter aforesaid of said shank whereby said stud has lateral support from said bushing at one end by said bearing and at its other end by said neck, a coil spring in said housing around said shank and bearing at one end against said bearing and at its other end against said cross-wall thereby tending to slide the head end of the stud outwardly away from the underlying end of the bushing when the stud is in released condition, said neck having a peripheral groove next to said housing, a snap ring in said groove traversing said slot and thereby preventing outward withdrawal of said protuberances therebeyond, said housing having longitudinal channels on its exterior, said channels stopping short of the rearward end of said housing, a snap ring around said housing with tongues projecting into said channels thereby accommodating limited outward withdrawal of said bushing from said front member when the stud is released from engagement in said socket element, and a nut within said socket element and having threaded engagement therewith, said nut having an internal diameter enabling said bushing neck to enter within said nut in slidable engagement therewith, said nut being split and adapted to be contracted by wedging engagement of its threads with the threads of said socket element, and said nut having a key-hole slot for passing said protuberances therethrough to the upper end thereof and onto the end of said nut for exerting a longitudinal pull on said stud as said nut is screwed into tight engagement with said protuberances.

References Cited in the file of this patent

UNITED STATES PATENTS

| | | |
|---|---|---|
| 1,431,076 | Yungkruger | Oct. 3, 1922 |
| 2,388,273 | Lord | Nov. 6, 1945 |
| 2,394,104 | Rankin | Feb. 5, 1946 |
| 2,486,411 | Huelster | Nov. 1, 1949 |
| 2,514,113 | Zahodiakin | July 4, 1950 |
| 2,590,597 | Brown | Mar. 25, 1952 |
| 2,636,194 | Schneider | Apr. 28, 1953 |
| 2,640,244 | Becker | June 2, 1953 |
| 2,757,429 | Summers | Aug. 7, 1956 |